(12) United States Patent
Shooshtari et al.

(10) Patent No.: US 8,651,285 B2
(45) Date of Patent: Feb. 18, 2014

(54) PERFORMANCE POLYMERIC FIBER WEBS

(75) Inventors: Kiarash Alavi Shooshtari, Littleton, CO (US); James Patrick Hamilton, Port Matilda, PA (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 566 days.

(21) Appl. No.: 12/543,586

(22) Filed: Aug. 19, 2009

(65) Prior Publication Data

US 2011/0042302 A1 Feb. 24, 2011

(51) Int. Cl.
*C08G 73/00* (2006.01)
*B01D 24/00* (2006.01)

(52) U.S. Cl.
USPC ........... 210/503; 528/224; 528/227; 528/229; 528/367; 528/369; 210/508

(58) Field of Classification Search
USPC ........... 210/508, 503; 525/7.3, 21, 22, 33, 35; 442/327; 528/224, 227, 229, 367, 369
See application file for complete search history.

(56) References Cited

U.S. PATENT DOCUMENTS

| | | | |
|---|---|---|---|
| 1,801,053 A | 4/1931 | Meigs | |
| 6,387,506 B1 * | 5/2002 | Kawamura et al. | 428/413 |
| 7,655,711 B2 | 2/2010 | Swift et al. | |
| 2005/0059770 A1 * | 3/2005 | Srinivasan et al. | 524/494 |
| 2007/0027283 A1 * | 2/2007 | Swift et al. | 527/312 |
| 2007/0123679 A1 | 5/2007 | Swift et al. | |
| 2007/0123680 A1 | 5/2007 | Swift et al. | |
| 2009/0182108 A1 * | 7/2009 | Shooshtari et al. | 526/318.3 |

FOREIGN PATENT DOCUMENTS

| | | |
|---|---|---|
| DE | 19 05 054 A1 | 8/1969 |
| DE | 43 08 089 A1 | 9/1994 |
| EP | 1 510 607 A1 | 3/2005 |
| WO | 2007/014236 A2 | 2/2007 |

* cited by examiner

*Primary Examiner* — David C Mellon
*Assistant Examiner* — Allison Fitzsimmons
(74) *Attorney, Agent, or Firm* — Robert D. Touslee

(57) ABSTRACT

Provided are nonwoven polymeric fiber webs using an improved curable composition. Such curable composition comprises a reaction product of an amine and a reactant in the form of an amino-amide intermediate. To the amino-amide is added an aldehyde or ketone to form the curable binder composition. The composition when applied to the polymeric fibers is cured to form a water-insoluble polymer binder which exhibits good adhesion and thermo-dimensional stability.

25 Claims, 1 Drawing Sheet

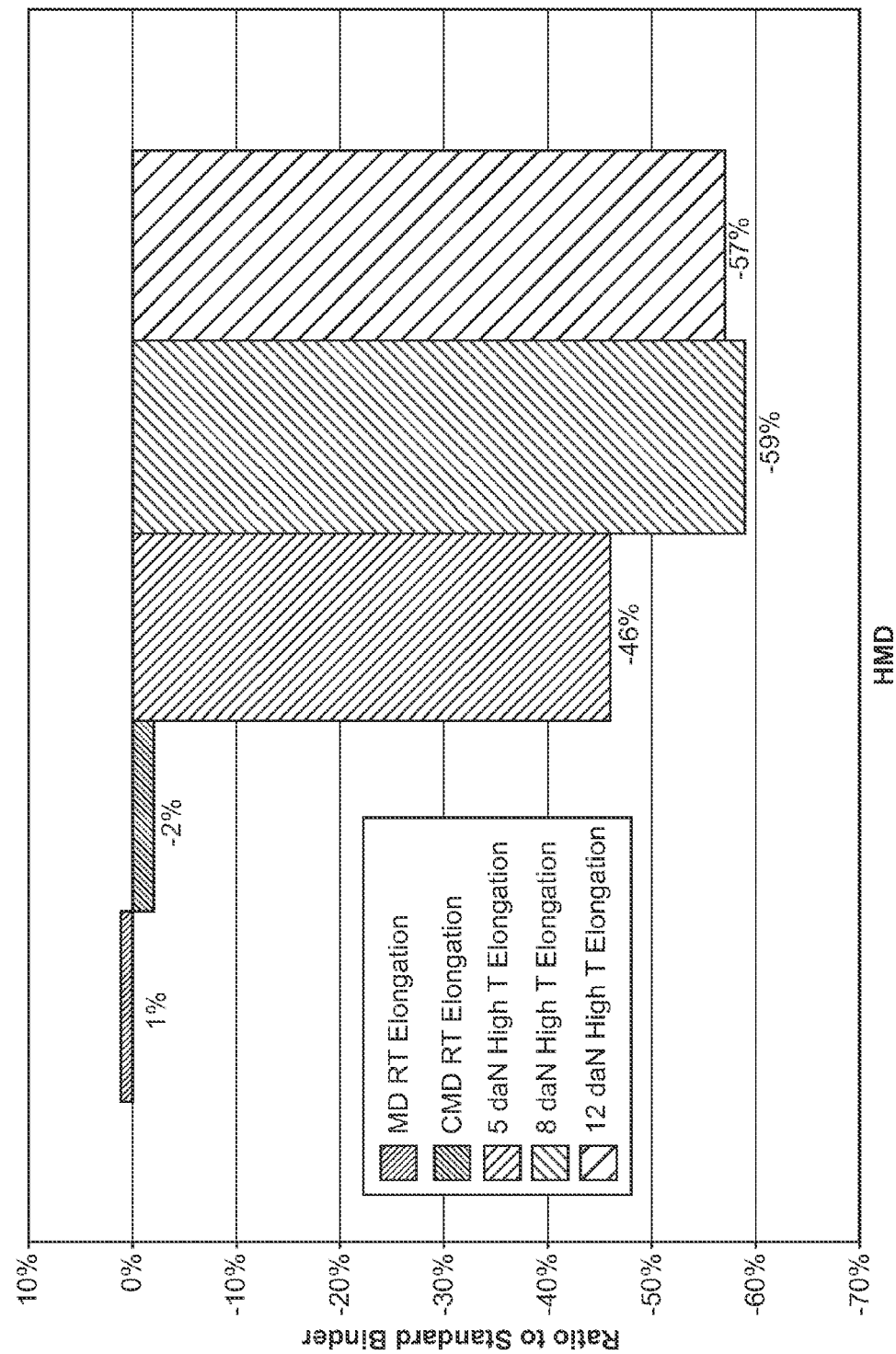

PERFORMANCE POLYMERIC FIBER WEBS

BACKGROUND

The subject invention pertains to polymeric fiber webs with an improved binding composition and load bearing at elevated temperatures. More specifically, the invention pertains to non-woven polymeric fiber webs found using an improved curable composition comprising an addition product of an amine and a saturated or unsaturated reactant in the form of an amino-amide intermediate. An aldehyde or ketone is added to the amino-amide to form a composition which upon curing is capable of forming a water-insoluble polymer composition.

Nonwoven webs comprised of polymeric fibers have a variety of applications. The applications can range from prepeg laminates; polishing or abrasive pads; separators for alkali battery cells; laminated materials for electrical circuit boards; filters, both for gas and liquids; diapers; towels; wipes; industrial and medical garments; foot covers; sterilization wraps, etc.

In many of the applications, the polymeric fibers of the nonwoven web must exhibit good physical properties such as chemical resistance and heat resistance. The nonwoven web is many times used in a hazardous environment, and therefore demands are placed on its construction. This would include not only the polymeric fibers, but also the binder used in the nonwoven web. Many different binders have been used in the past for nonwoven polymeric fiber webs.

For example, in U.S. Pat. No. 7,026,033, a heat resistant nonwoven web comprised of organic synthetic fibers also uses an organic resin binder. The binder is selected from an epoxy resin, phenol resin, melamine resin, formaldehyde resin and fluropolymer resin.

U.S. Pat. No. 7,534,163 describes a non-woven fabric for a polishing pad used to polish semi-conductors. The fibrous component of the pad can be selected among polyester, polypropylene, polyamide, acrylic, polyethylene and cellulosic materials. The binder used for the pad includes resins of polyurethanes, polyacrylates, polystyrenes, polyamides, polycarbonates and epoxies.

Economies without sacrificing physical properties is always a concern in preparing such non-woven polymeric fiber webs. The industry continuously searches for non-woven polymeric fiber webs that can provide the physical properties needed to achieve the required performance, but which offer an economic advantage.

Accordingly, in one aspect the present invention provides a novel nonwoven polymeric fiber web comprised of a non-phenol-formaldehyde binder.

Another aspect of the invention provides a novel nonwoven polymeric fiber web with a binder which provides advantageous flow properties, the possibility of lower binder usage, the possibility of overall lower energy consumption, increased sustainability of the raw materials utilized in the formation of the binder, considerable reduction in the use of petroleum based ingredients, elimination of process corrosion, elimination of interference in the process by a silicone, and improved overall economics.

Still another aspect of the present invention is to provide a nonwoven polymeric fiber web which uses a suitable binder having improved economics, while also enjoying improved physical properties, including chemical resistance and heat resistance.

These and other aspects of the present invention will become apparent to the skilled artisan upon a review of the following description and the claims appended hereto.

SUMMARY OF THE INVENTION

Provided is a nonwoven web comprised of polymeric fibers. The binder is a curable composition comprising the reaction product of an amine and a reactant in the form of an amino-amide intermediate. To this intermediate is added an aldehyde or ketone, preferably a reducing sugar, to form the curable binder composition. This composition upon curing is capable of forming a water-insoluble polymer.

A process for preparing the nonwoven web of polymeric fibers is also provided, comprising applying to the polymeric fibers a composition comprising an addition product of an amine and a reactant in the form of an amino-amide intermediate, and an aldehyde or ketone. Thereafter the composition is cured while present as a coating on the polymeric fibers to form a water-insoluble polymer.

In one embodiment, the amino-amide intermediate is first heated to create an oligomer. The aldehyde or ketone is added to the oligomer. This composition is added to the polymeric fibers as a binder and cured.

In a preferred embodiment the resulting non-woven product is a mat. The non-woven product can be used as a roofing membrane. In other embodiments the non-woven product is a filter or separator for alkali battery cells.

BRIEF DESCRIPTION OF THE FIGURE OF THE DRAWING

In the FIGURE of the Drawing, machine and cross-machine direction tensile elongation and elevated temperature relative tensile elongation of a HMDA/MAn/Dextrose binder are expressed graphically as a ratio to a standard latex binder system. The MD and CMD tensile elongation tests were conducted at room temperature. The relative tensile elongation tests were conducted at 200° C. and the absolute elongation is determined at tensile loadings of 5, 8, and 12 daN, respectively.

DETAILED DESCRIPTION OF PREFERRED EMBODIMENTS

The polymeric fibers that can be used in preparing the nonwoven webs and products can be any useful synthetic fibers, preferably synthetic organic fibers. The fibers, upon application of the unique binder of the present invention, are formed into a nonwoven web. Such nonwoven webs have numerous applications, such as prepeg laminates; polishing, abrasive or cleaning pads; separators for alkali cells; filters for liquids or gases; laminated materials for electrical circuit boards; diapers; wipes; industrial garments; foot covers; sterilization wraps, etc. Of particular application are such nonwoven webs in hazardous environments requiring chemical and high temperature tolerance. The synthetic fibers in combination with the particular binder of the present invention allows one to achieve a nonwoven web that can meet the requirements of all the foregoing applications.

Among the fibers which can be used to form the nonwoven webs are polyester, polypropylene, polyamide, acrylic, polyethylene, cellulosic, sulfones, polysulfones, polyether ketones, polysiloxanes, polybutylene, halogenated polymers such as polyvinyl chloride, polyaramids, melamine and melamine derivatives, polyurethanes, copolymers thereof and combinations thereof. Bicomponent fibers can be used, wherein the core and sheath materials may be different from one another, or in a side-by-side configuration. The nonwoven webs can be formed by applying a binder to the fibers using conventional techniques. However, a particular binder is employed in preparing the nonwoven webs of the present invention.

The binder of the present invention which is employed to prepare the nonwoven web of polymeric fibers is a curable composition comprising the reaction product of an amine and a reactant in the form of an amino-amide intermediate, and a carbonyl functional material such as an aldehyde or ketone.

In accordance with one embodiment of the invention, amine reactants are selected which are capable of undergoing conjugate addition to form the requisite amino-amide, which forms a water-insoluble polyimide upon curing. In such an embodiment the amine is a di- or multi-functional primary or secondary amine. More preferably the amine is a diamine having at least one primary amine group.

Example of amines include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, acids, ethers and others.

Representative amines that are suitable for use in such an embodiment include 1,2-diethylamine, 1,3-propanediamine, 1,4-butanediamine, 1,5-pentanediamine, 1,6-hexanediamine, $\alpha,\alpha'$-diaminoxylene, diethylenetriamine, triethylenetetramine, tetraethylenepentamine, and mixtures of these. A preferred diamines for use in this embodiment of the invention are 1,4-butanediamine and 1,6-hexanediamine. Natural and synthetic amino acids such as lysine, arginine, histidine, etc can also be used.

The curable amino-amide is formed through the selection of a saturated or unsaturated reactant that is an anhydride, carboxylic acid, ester, salt or mixture of such reactants. Representative unsaturated reactants are maleic acid, fumaric acid, maleic anhydride, mono- and di-esters of maleic acid and fumaric acid, and salts and mixtures of these. Ammonium salts of the unsaturated acids of their monoesters conveniently can be utilized. A preferred unsaturated reactant for use is maleic anhydride. Representatives of suitable saturated reactant include, but are not limited to, succinic anhydride, succinic acid, mono and diesters of succinic acid, glutaric acid and anhydride, phthalic acid and anhydride, tetrahydro phthalic acid and anhydride, mono and diesters of acid anhydrides and salts of the acids and their mono esters. Examples of preferred saturated reactants are phthalic anhydride and tetrahydro phthalic anhydride.

The amino-amide addition products can be readily formed by mixing the components in an aqueous medium at room temperature. The resulting addition products are either water-soluble, water-dispersible, or are present as an emulsion.

To the solution of amino-amide, the carbonyl functional materials can be added, especially an aldehyde or ketone. Due to their higher reactivity, aldehydes are preferred to ketones. The curable binder composition comprises the amino-amide and the aldehyde and/or ketone. Some reaction does take place within the composition between the components. However, the reaction is completed during the curing steps, followed by the cross-linking reaction of curing.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, poly acrolein, copolymers of acrolein and others. Reducing mono, di- and polysaccharides such as glucose, maltose, celobiose etc. can be used, with reducing monosaccharides such as glucose being preferred.

Examples of ketones include, but are not limited to, acetone, acetyl acetone, 1,3 dihydroxy acetone, benzil, bonzoin, fructose, etc.

The aldehydes and ketones react with the amino-amide intermediate, which contains an amic acid function, i.e., an amide linkage in the vicinity of a carboxylic acid. An amic acid function is more reactive than a simple carboxylic acid. The amount of aldehyde and/or ketone added is generally such that the molar ratio of acid in the amino-amide to carbonyl or ketone is from 1:50 to 50:1. A ratio of 1:20 to 20:1 is more preferred, with a ratio of 1:10 to 10:1 being most preferred.

One advantage is that the presence of all functional groups, i.e., amine, amide and carboxylic acid, on the same molecule eliminates the potential need for the addition of external crosslinkers or binders such as polycarboxylic acids and/or polyvinyl alcohol. Such crosslinkers can be added, however if desired.

In an embodiment, the amino-amide can be first oligomerized prior to adding the aldehyde or ketone. The amino-amide can be heated until an oligomer is obtained, e.g., a dimer, trimer or tetramer of the amino-amide intermediate. An example of suitable conditions for making the oligomer involves heating in the range of from 120-150° C. for up to 5 hours.

Using the oligomerized product has been found to result in a more robust binder product upon curing. This manifests itself in the strength of the binder, and allows for better storage results, higher tensile strength and rigidity and better recovery of products made with the binder.

The composition when applied to the polymeric fibers optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

The composition of the present invention can be added to the polymeric fibers as a binder by a variety of techniques. In preferred embodiments these include spraying, spin-curtain coating, and dipping-roll coating. The composition can be applied to freshly-formed polymeric fibers, or to the polymeric fibers following collection. Water or other solvents can be removed by heating.

Thereafter the composition undergoes curing wherein a polymeric binder is formed which exhibits good adhesion to the polymeric fibers. The polymetric composition obtained upon curing is a combination of a polyaminic-amide and a polyamino-imide. The polyimide is the primary product, but some of the amide in the intermediate is believed to not form the imide. Thus, some polyamino-amide is also present in the cured composition binder.

Such curing can be conducted by heating. Elevated curing temperatures on the order of 100 to 300° C. generally are acceptable, but below the melting temperature of the polymeric fibers. Satisfactory curing results are achieved by heating in an air oven at 200° C. for approximately 20 minutes.

The cured binder at the conclusion of the curing step commonly is present as a secure binder in a concentration of approximately 0.5 to 50 percent by weight of the polymeric fibers, and most preferably in a concentration of approximately 1 to 25 percent by weight of the polymeric fibers.

The present invention provides a formaldehyde-free route to form a securely bound formaldehyde-free fiberglass product. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also faster and therefore does favor the economics while reducing the energy consumption during the curing process and lowering the carbon footprint. The binder also contains high level of sustainable raw materials further reducing the dependency to fossil based sources for the resin. Due to the hydrophobic nature of the present invention, the need for a water repellant such as silicones is eliminated or greatly reduced.

The following examples are presented to provide specific illustrations of the present invention. In each instance the thin glass plate substrate that receives the coating can be replaced by synthetic organic fibers. By applying the binder in the examples to polymeric fibers, an improved nonwoven web comprised of polymeric fibers can be achieved. It should be understood, however, that the invention is not limited to the specific details set forth in the Examples.

Formation of Amino-Amide Intermediates:

To 1160 g 1,6 hexane diamine (HMDA) dissolved in 2140 g water, 980 g maleic anhydride (MAn) was added slowly (molar ratio of 1:1) and the solution was stirred for 10 min. The intermediate was labeled HM.

To 1160 g HMDA dissolved in 2640 g water was added 1480 g phthalic anhydride. After the anhydride dissolved, the intermediate was labeled HPh.

To 1160 g HMDA dissolved in 2680 g water was added 1520 g tetrahydro phthalic anhydride. The solution was stirred until all anhydride dissolved. The intermediate was labeled HT.

These intermediates were utilized to make the following resins with glucose.

EXAMPLE 1

To 42.8 g of solution of HM intermediate, anhydrous dextrose (alpha-D-glucose) and water was added. The mass of added water was chosen to be equal to that of the corresponding dextrose. The mass of dextrose (and corresponding water) used was 18 g, 36 g. 54 g, 72 g, 90 g, 108, 144, 180 g and 216 g. The various solutions were stirred at ambient temperature for 10 min. The solutions were applied as thin film on glass and A1 panel, dried in an oven at 100° C. for 5 min and cured at 200° C. for 20 min. Each film gave a cured brown polymer that was hard and insoluble in water and solvents.

EXAMPLE 2

To 52.8 g of solution of HPh intermediate, anhydrous dextrose and water was added. The mass of added water was chosen to be equal to that of the corresponding dextrose. The mass of dextrose (and corresponding water) used was 18 g, 36 g. 54 g, 72 g, 90 g, 108, 144, 180 g and 216 g. The various solutions were stirred at ambient temperature for 10 min. The solutions were applied as a thin film on glass and A1 panel, dried in an oven at 100° C. for 5 min and cured at 200° C. for 20 min. Each solution gave a cured brown polymer that was hard and insoluble in water and solvents.

EXAMPLE 3

To 53.6 g of solution of HT intermediate, anhydrous dextrose and water was added. The mass of added water was chosen to be equal to that of the corresponding dextrose. The mass of dextrose (and corresponding water) used was 18 g, 36 g. 54 g, 72 g, 90 g, 108, 144, 180 g and 216 g. The various solutions were stirred at ambient temperature for 10 min. The solutions were applied as a thin film on glass and A1 panel, dried in an oven at 100° C. for 5 min and cured at 200° C. for 20 min. Each solution gave a cured brown polymer that was hard and insoluble in water and solvents.

EXAMPLE 4

Examples 1-3 were repeated in the presence of 5% by weight ammonium sulfate. The polymers became insoluble in water in less than 10 min.

EXAMPLE 5

To 116 g. HMDA dissolved in 214 g water was added slowly 98 g maleic anhydride (MAn), this was a molar ratio of 1:1. The resulting solution was refluxed for 60 minutes to prepare an amino-amide oligomer. The solution was opaque with 50% solids. The solution was then used to repeat example 2 with the observed results being the same, i.e., the cured polymer was hard and insoluble in water solvents.

EXAMPLE 6

Examples 5 was repeated in the presence of 5% by weight ammonium sulfate. The polymers became insoluble in water in less than 10 min.

EXAMPLE 7

Plant Trial

In a non-limiting example, a dextrose-based binder was applied to a spunbond mat for evaluation of physical properties. The binder included in this example has a composition of hexamethylenediamine/maleic anhydride/dextrose (HMDA/MAn/Dextrose) in which the molar equivalent ratios between each component are 1/1/3. The binder was diluted with tap water and applied to a spunbond mat via a dip-and-squeeze coating application. The coated mat was dried and cured in a standard convection oven set at 215° C.

The spunbond mat tensile and trap tear strengths were measured in both the machine and cross-machine directions at room temperature using a standard Instron. The binder system yielded comparable tensile strength and improved tear strength in comparison to a standard latex binder system.

The elongation of the spunbond mat was also measured at both room temperature and elevated (200° C.) temperature. The results are shown in the FIGURE of the Drawing. In the room temperature test, % tensile elongation in both the machine and cross-machine directions is determined at the maximum tensile loading. The elevated temperature % tensile elongation is determined at tensile loadings of 5, 8, and 12 daN, respectively. The binder system yielded 50-60% improvement in tensile elongation at elevated temperature while providing comparable tensile elongation at room temperature in comparison to a standard latex binder system. The overall performance of the binder is superior to any commercially available thermoplastic latex or formaldehyde-free thermosetting binder system and has the added advantage of being primarily derived from renewable raw materials.

The principles, preferred embodiments, and modes of operation of the present invention have been described in the foregoing specification. The invention which is intended to be protected herein, however, is not to be construed as limited to the particular forms disclosed, since these are to be regarded That which is claimed is:

1. A nonwoven web of polymeric fibers comprising a binder comprised of a reaction product between (1) an aldehyde or ketone and (2) an amine group on an amino-amide intermediate, wherein the amino-amide intermediate also has an amide group that is formed by a conjugate addition reaction of a polyamine, having at least a first amine group and a second amine group, with an organic anhydride, and wherein a first amine group of the polyamine forms a covalent bond with a carbonyl group of the organic anhydride to form the amide group and a carboxylic acid group of the amino-amide intermediate.

2. The nonwoven web of claim 1, wherein the polyamine is a diamine having at least one primary amine group, and the organic anhydride is selected from the group consisting of saturated and unsaturated anhydrides.

3. The nonwoven web of claim 2 wherein said polyamine is selected from the group consisting of ethylene diamine, 1,3-propanediamine, 1,4-butanediamine, 1,5-pentanediamine 1,6-hexanediamine, α, α'-diaminoxylene, diethylenetriamine triethylenetetramine, tetraethylenepentamine, and mixtures thereof.

4. The nonwoven web of claim 1, wherein said organic anhydride is selected from the group consisting of, maleic anhydride, itaconic anhydride, phthalic anhydride, tetrahydro phthalic anhydride, succinic anhydride, and glutaric anhydride.

5. The nonwoven web of claim 4, wherein said organic anhydride is maleic anhydride.

6. The nonwoven web of claim 1, wherein the binder comprises the reaction product of the aldehyde with the amino-amide intermediate.

7. The nonwoven web of claim 6, wherein the aldehyde is a reducing sugar.

8. The nonwoven of claim 6, wherein the aldehyde is a reducing monosacchoride.

9. The nonwoven web of claim 8, wherein the aldehyde is glucose.

10. The nonwoven web of claim 1, with the hinder further comprising at least one component selected from the group consisting of adhesion promoters, oxygen scavengers, moisture repellants, solvents, emulsifiers, pigments, tillers, anti-migration aids, coalescent aids, wetting agents, biocides, plasticizers, organosilanes, anti-foaming agents, colorants, waxes, suspending agents, anti-oxidants, and crosslinking catalysts.

11. The nonwoven web of claim 1, wherein the web is a filter.

12. A nonwoven web comprising:
polymeric fibers; and
a binder comprising, a reaction product of:
(i) an aldehyde or ketone; and
(ii) an amino-amide compound, wherein the amino-amide compound is formed by reacting an organic anhydride with 1,6-hexanediamine.

13. The nonwoven web of claim 12, wherein the polymeric fibers include one or more types of fiber chosen from polyester fibers, polypropylene fibers, polyamide fibers, acrylic fibers, polyethylene fibers, cellulosic fibers, sulfone fibers, polysulfone fibers, polyether ketone fibers, polysilaxane fibers, polybutylene fibers, polyvinyl chloride fibers, polyaramid fibers, melamine fibers, and polyurethane fibers.

14. The nonwoven web of claim 12, wherein the aldehydeor ketone comprises a reducing sugar.

15. The nonwoven web of claim 14, wherein the reducing sugar comprises dextrose.

16. The nonwoven web of claim 12, wherein the organic anhydride includes one or more reactants chosen from maleic anhydride, itaconic anhydride, phthalic anhvdride, tetrahydro phthalic anhydride, succinic anhydride, and glutaric anhydride.

17. The nonwoven web of claim 12, wherein the amino-amide compound further comprises a carboxylic acid group.

18. A nonwoven web comprising:
polymeric fibers: and
a binder comprising;
(A) a reaction product of:
(i) a reducing sugar; and
(ii) an amino-amide compound, wherein the amino-amide compound further comprises a carboxylic acid group; and
(B) a polyimide formed by a reaction product of an amide group on the amino-amide compound and the carboxylic acid group on the amino-amide compound.

19. The nonwoven web of claim 18, wherein the polymeric fibers include one or more types of fiber chosen from polyester fibers, polypropylene fibers, polyamide fibers, acrylic fibers, polyethylene fibers, cellulosic fibers, suifone fibers, polysulfone fibers, polyether ketone fibers, polysiloxane fibers, polybutylene fibers, polyvinyl chloride fibers, polyaramid fibers, melamine fibers, and polyurethane fibers.

20. The nonwoven web of claim 18, wherein the reducing sugar comprises dextrose.

21. The nonwoven web of claim 18, wherein the amino-amide compound is formed by the reaction of 1,6-hexane diamine and maleic anhydride.

22. The nonwoven web of claim 18, wherein the amino-amide compound if formed by the reaction of 1,6-hexane diamine and phthalic anhydride.

23. The nonwoven web of claim 18, wherein the amino-amide compound if formed by the reaction of 1,6-hexane diamine and tetrahydro phthalic anhydride.

24. The nonwoven web of claim 1, wherein the carboxylic acid group of the amino-amide intermediate reacts with the amide group to form an imide group, and wherein the binder comprises a polyimide.

25. The nonwoven web of claim 1, wherein the polyamine is 1,6-hexane diamine, the organic anhydride is maleic anhydride.

* * * * *